3,321,539
CYCLOHEXENE PRODUCTION
Lynn H. Slaugh, Lafayette, Calif., assignor to Shell Oil Company, New York, N.Y., a corporation of Delaware
No Drawing. Filed Feb. 23, 1965, Ser. No. 434,610
4 Claims. (Cl. 260—666)

This invention relates to an improved method for the production of cyclohexene by the partial reduction of benzene.

Several chemical methods are available in the art for the partial reduction of benzene. U.S. Patent No. 2,182,242, issued Dec. 5, 1939, to Wooster describes a low-temperature reduction of benzene by contact with sodium and liquid ammonia in the presence of excess added more acidic material such as water or alcohol to produce cyclohexadiene. A recent modification of this process is disclosed by French Patent 1,363,841, granted May 4, 1964, to Yamaguchi et al., wherein utilization of amounts of water or alcohol less than equivalent to the amount of alkali metal, e.g., sodium, that is present results in the formation of cyclohexene. This process, even when conducted in the total absence of water or other added acidic material has the attendant disadvantage of requiring a large excess of liquid ammonia which serves as the reaction diluent as well as the source of the hydrogen introduced into the aromatic ring during the reduction process. The requirement for large excesses of ammonia creates rather serious problems with regard to product separation and ammonia recycle and thus increases processing costs during any large-scale commercial operation. It would be of advantage to provide a more economical process for benzene reduction to cyclohexene.

It is an object of the present invention to provide an improved process for the partial reduction of benzene to cyclohexene. More particularly it is an object to provide a process for the partial reduction of benzene to cyclohexene by contact with certain alkali metals and liquid ammonia whereby substantially stoichiometric quantities of alkali metal and ammonia are employed.

It has now been found that these objects are accomplished by the process of contacting benzene with certain alkali metals and liquid ammonia in selected proportions in the presence of a hydrocarbon reaction diluent. In contrast with the processes of the prior art the present process is characterized by utilization of substantially stoichiometric quantities of the alkali metal and ammonia reactants, and hydrocarbon rather than a large excess of ammonia serves as the reaction diluent. The avoidance of large amounts of ammonia results in a substantial decrease in the magnitude of processing and recycling difficulties, thereby offering substantial economic advantages.

The alkali metal suitably employed in the process of the invention is a member of Group I–A of the Periodic Table having an atomic number from 19 to 55 inclusive, that is, potassium, rubidium, or cesium. In the hydrocarbon-rich reaction system of the process of the invention, sodium employed alone is non-reactive under the conditions employed and the use thereof results in little or no conversion of the benzene reactant and essentially no formation of cyclohexene. The remaining alkali metal, lithium, is reactive under the reaction conditions utilized, but the reduced product comprises principally a mixture of 1,3- and 1,4-cyclohexadienes with only minor proportions of the desired cyclohexene being formed. Alkali metal having an atomic number from 19 to 55 inclusive is suitably employed, however, as well as mixtures of these metals, and results in the essentially exclusive formation of cyclohexene. Largely because of economic considerations and the more vigorous reaction conditions employable therewith, in the preferred modification of the process of the invention, potassium is employed as the alkali metal.

The alkali metal is typically employed in amounts in excess of the benzene reactant. Without wishing to be bound by any particular theory, it appears likely that the initial reaction of benzene and alkali metal results in the formation of a mono-metal derivative, e.g., of a benzene free-radical anion, which subsequently reacts with ammonia to introduce hydrogen into the aromatic ring and produce alkali metal amide. Subsequent reactions with additional metal and ammonia result in formation of the observed cyclohexene product. From consideration of the probable stoichiometry of the reaction, four gram-atoms of alkali metal are required for the conversion of each mole of benzene to cyclohexene. While varying amount of alkali metal will react directly with the ammonia present to produce molecular hydrogen and alkali metal amide, and therefore will not be available for reaction with benzene, amounts of alkali metal less than stoichiometric may be employed if it is not required to effect a high conversion of the benzene reactant. Thus, ratios of gram-atoms of alkali metal to moles of benzene from about 3:1 to about 8:1 are suitably employed, although ratios of gram-atoms of alkali metal to moles of benzene from about 4:1 to about 6:1 are preferred.

The reaction diluent employed in the present process is a hydrocarbon reaction diluent capable of dissolving the benzene reactant and the cyclohexene product. Although the physical nature of the reaction system is not known with certainty, it is considered likely that the reaction system is heterogeneous in character with at least the alkali metal being insoluble in the hydrocarbon phase. Although numerous hydrocarbon materials are suitable as reaction diluents, particularly inert aliphatic acyclic and alicyclic hydrocarbons such as decane, octane, dodecane, decalin and the like, in order to obtain facile product separation it is desirable to employ either benzene or cyclohexene as the reaction diluent, that is, the reaction diluent comprises either an excess of the benzene reactant or the cyclohexene product obtainable therefrom, thereby avoiding the introduction of additional components into the reaction system and the product mixture and thus simplifying the recovery procedure. In practical applications a substantial proportion, e.g., 10–70% of the benzene fed to the reaction system is unconverted on a once-through basis. Consequently the product stream contains a substantial, but minor molar proportion, e.g., about 5–30% mole, of benzene mixed with product cyclohexene and reaction diluent. When cyclohexene diluent is used, the unconverted benzene can be separated together with the diluent portion of cyclohexene from the product portion of the cyclohexene corresponding to the benzene converted by flashing or distillation. Thus, the use of cyclohexene as reaction diluent is advantageous since the unconverted benzene can be recovered in admixture with the reaction diulent for recycle, by simple means of partial vaporization, from high purity product cyclohexene. When a higher boiling inert hydrocarbon is used as reaction diluent, unconverted benzene and product cyclohexene can be distilled together therefrom and the benezene separated from the cyclohexene by any suitable means, such as by extractive distillation or solvent extraction with a suitable solvent selective for benzene such as phenol, fulfolane, furfural, nitrobenzene, diethylene glycol, or the like.

The relative proportions of benzene and inert hydrocarbon diluent may vary over a wide range. It is, of course, within the contemplated scope of the invention to employ a hydrocarbon phase consisting solely of benzene. Alternatively, a hydrocarbon phase containing as low as 10 mole percent benzene and the remainder being essentially inert hydrocarbon diluent is also suitable. In the modification wherein cyclohexene is used as reaction diluent, hydrocarbon phase containing from about 15 to about 40 mole percent benzene and the remainder being essentially cyclohexene is particularly suitable. In general, ratios of alkali metal to moles of total hydrocarbon present, i.e., the sum of the moles of benzene reactant and the moles of benzene or other hydrocarbon diluent, or from about 2:1 to about 1:3 are satisfactory. Best results are obtained, however, when a ratio of gram-atoms of alkali metal to moles of total hydrocarbon of from about 1.5:1 to about 1:2 is employed.

The process of the invention is conducted in the presence of liquid ammonia and in the substantial absence of added hydrolytic agent, that is, hydrolytic agent other than ammonia. By the term hydrolytic agent as employed herein is meant a substance capable of reacting with the alkali metal under the conditions of the reaction. A principal advantage of the process of the invention resides in the fact that when ammonia is employed substantially free from added hydrolytic agent, the alkali metal-containing product is the alkali metal amide, $MNH_2$, regardless of the mode of alkali metal reaction, from which amide the alkali metal is easily regenerated, as by hydrogenolysis of the amide to the corresponding alkali metal hydride and subsequent pyrolysis of the hydride to liberate elemental alkali metal. In contrast, processes employing added more acidic hydrolytic agents such as water or alcohol result in the recovery of the alkali metal in a form from which the metal is not easily regenerated, e.g., the hydroxide or the alkoxide. Although the presence of small amounts of hydrolytic agent other than ammonia, e.g., up to about 5–10% by weight based on the ammonia, is not overly detrimental to the process of the invention, it does not appear that any advantage is gained thereby and, of course, the presence of even small amounts of hydrolytic agent other than ammonia results in the effective loss of alkali metal.

The ammonia is preferably employed in molar amounts equivalent to or in excess over the gram-atoms of alkali metal. Although the stoichiometric ratio of moles of ammonia to gram-atoms of alkali metal is 1:1, ratios of moles of ammonia to gram-atoms of alkali metal from about 0.5:1 to about 2.5:1 are satisfactory, with best results being obtained when the ratio is from about 1:1 to 2:1 on the same basis. Compared to the total hydrocarbon present in the reaction mixture, molar ratios of ammonia to total hydrocarbon of about 1:6 to about 5:1 are suitable although molar ratios of from about 1:2 to about 3:1 are preferred.

The process of the invention is adaptable for continuous or semicontinuous operation, as in a tubular flow reactor, or is conducted in batchwise manner in an autoclave or similar pressure vessel. In either modification, the process is preferably conducted at somewhat elevated temperature and pressure. In general, reaction temperatures from about 10° C. to about 90° C. are satisfactory with the more rapid rates of reaction being obtained at the higher reaction temperatures, although the advantages gained by the use of the comparatively high temperatures are somewhat offset by a decrease in the selectivity to cyclohexene based on the alkali metal reactant. From practical considerations, best results are obtained when reaction temperatures from about 40° C. to about 60° C. are utilized. Reaction pressures suitably employed are those pressures sufficient to maintain the reaction mixture substantially in a condensed, i.e., non-gaseous, state. Although the optimum pressure will in part depend upon the particular reaction temperature utilized, pressures of from about 2 atmospheres to about 200 atmospheres are generally suitable. Frequently good results are obtained when autogenetic pressure is employed, i.e., the pressure obtained by heating the reaction mixture to the desired reaction temperature in a sealed reaction vessel. In the latter modification, the process is conducted in an atmosphere of ammonia. The presence of other reactive gaseous materials is preferably avoided. It is, on occasion, useful to pressurize the reactor with an inert gas such as helium, argon or the like, prior to or simultaneously with heating the reaction mixture to reaction temperature, but in the preferred modification of the invention, no extraneous gaseous materials are present.

Subsequent to reaction the product mixture is separated and the cyclohexene product is recovered by conventional means, as by fractional distillation, selective extraction, fractional crystallization or the like. The unreacted starting materials, if any, as well as the reaction diluent are recoverable and may be recycled, and the alkali metal amide is further treated to regenerate the alkali metal.

The cyclohexene product is a chemical of commerce and is used, for example, as an intermediate in the production of $\alpha,\omega$-dicarboxylic acids, $\alpha,\omega$-dicarboxylic acid amides, polyesters, polyamides and the like.

To further illustrate the improved process of the invention, the following examples are provided. It should be understood that the details thereof are not to be regarded as limitations, as they may be varied as will be understood by one skilled in this art.

*Example I*

To an autoclave was charged 0.5 mole of benzene, 0.4 gram-atom of potassium and 0.59 mole of liquid ammonia. The reactor was sealed and maintained at 36° C.–44° C. for 4.25 hours. At the conclusion of reaction, the reactor was cooled and opened and the ammonia and organic materials were removed from the amide by distillation. All of the potassium had reacted. The product mixture was analyzed by gas-liquid chromatography which indicated that the selectivity for cyclohexene production, based on the potassium which was the limiting reactant, was 64.5%; the remainder of the potassium produced molecular hydrogen from ammonia. No cyclohexene or cyclohexadiene was observed in the product mixture.

*Example II*

The procedure of Example I was employed to contact 0.51 mole of benzene, 0.4 gram-atom of sodium and 0.59 mole of liquid ammonia at 60° C. for 8 hours. At the end of the reaction period, most of the sodium was recovered unchanged. The conversion of benzene was 0%, no reduced product being observed.

By a similar procedure, 0.49 mole of benzene, 0.4 gram-atom of lithium and 0.53 mole of liquid ammonia were maintained at 58° C.–62° C. for 2.25 hours. The product mixture was 35.8% 1,3-cyclohexadiene, 57.9% 1,4-cyclohexadiene and 6.3% cyclohexene, on a benzene-free basis.

*Example III*

To an autoclave was charged 0.1 mole of benzene, 0.42 mole of cyclohexene, 0.4 gram-atom of potassium and 0.53 mole of liquid ammonia. The reactor was sealed and the reaction mixture was maintained at 35° C.–38° C. for 4.5 hours. At the conclusion of this period, the reactor was cooled and opened and the volatile components were separated from the amide by distillation. The product mixture was analyzed by gas-liquid chromatography which indicated a 42% selectivity to cyclohexene, based on either the benzene or potassium charged. No cyclohexane or cyclohexadiene was observed in the product mixture.

*Example IV*

By procedures similar to those of Examples I and III, a series of experiments was conducted varying the reaction proportions, the quantity of reaction diluent and the reaction conditions. The results of this series are shown in Table I. The selectivity shown in the table is the selectivity for cyclohexene formation, based on the benzene, the potassium or the ammonia, whichever was the limiting reactant.

TABLE I

| Benzene, moles | Cyclohexene, moles | Metal, g.-atoms | Ammonia, moles | Temp., °C. | Time, hours | Selectivity, percent |
|---|---|---|---|---|---|---|
| 0.5 | 0 | K, 0.4 | 0.5 | 18 | 8 | 69.5 |
| 0.5 | 0 | K, 0.4 | 0.53 | 52 | 1.5 | 47.9 |
| 0.24 | 0 | K, 0.4 | 0.47 | 66–68 | 1.5 | >30 |
| 0.1 | 0.25 | K, 0.36 | 0.53 | 16–18 | 8 | 47.9 |
| 0.1 | 0.47 | K, 0.4 | 0.53 | 25–27 | 8 | 48.8 |
| 0.1 | 0.48 | K, 0.4 | 0.47 | 63–66 | 0.5 | 31 |
| 0.2 | 0.36 | K, 0.4 | 0.39 | 51–56 | 2 | 39.4 |
| 0.3 | 0.3 | K, 0.4 | 0.41 | 63–68 | 1 | 48.7 |
| 0.47 | 0 | Rb, 0.117 | 0.159 | 53 | 2.5 | 22.9 |

Example V

By a procedure similar to that of Example III, 0.1 mole of benzene in 50 ml. of n-dodecane was contacted with 0.4 gram-atom of potassium and 0.41 mole of liquid ammonia at 60–63° C. for 2.5 hours. The selectivity of benzene conversion to cyclohexene based on the potassium charged was 30.3%. No cyclohexane or cyclohexadiene was observed in the product mixture.

I claim as my invention:

1. The process of producing cyclohexene consisting essentially of the steps of (a) contacting a normally liquid hydrocarbon phase containing from 10 to 100 mole percent benzene and the remainder cyclohexene with alkali metal of atomic number from 19 to 55 inclusive and nongaseous ammonia in a ratio of 0.5 mole to 2.5 moles of ammonia per gram-atom of alkali metal and the ratio of ammonia to total hydrocarbon being from 1:6 to 5:1 in nongaseous phase at a temperature of about 10° C. to about 90° C., thereby producing a product mixture containing cyclohexene and the amide of said alkali metal, (b) separating the alkali metal amide from other product mixture components, (c) recovering the cyclohexene from the resulting alkali metal compound-free product mixture, (d) regenerating the alkali metal from the separated alkali metal amide by hydrogenolysis of the separated amide to the corresponding alkali metal hydride and pyrolysis of the resulting hydride to produce the alkali metal, and (e) recycling the regenerated alkali metal to step (a).

2. The process of claim 1 wherein the alkali metal is potassium employed in a ratio of 1 mole to 2 moles of ammonia per gram-atom of potassium, from 0.5 mole to 3 moles of ammonia are employed per mole of total hydrocarbon, and the mole percent of benzene is from 15 mole percent to 40 mole percent.

3. The process of claim 1 wherein the mole percent of benzene is 100 percent.

4. The process of claim 3 wherein the alkali metal is potassium and from 0.5 mole to 3 moles of ammonia are employed per mole of benzene.

References Cited by the Examiner

UNITED STATES PATENTS

| | | | |
|---|---|---|---|
| 2,182,242 | 12/1939 | Wooster | 260—666 |
| 2,432,843 | 12/1947 | Whitman | 260—666 |
| 3,274,272 | 9/1966 | Amagasa et al. | 260—666 |

FOREIGN PATENTS 1,363,841   5/1964   France.

DELBERT E. GANTZ, *Primary Examiner.*

V. O'KEEFE, *Assistant Examiner.*